United States Patent [19]
Frisbee

[11] 3,897,833
[45] Aug. 5, 1975

[54] CYLINDER TRUNNION MOUNTING

[75] Inventor: Claude M. Frisbee, Bettendorf, Iowa

[73] Assignee: J. I. Case Company, Racine, Wis.

[22] Filed: Jan. 28, 1974

[21] Appl. No.: 437,454

[52] U.S. Cl. ............ 172/809; 248/183; 403/67; 92/161
[51] Int. Cl. .................................. E02f 3/76
[58] Field of Search .............. 172/801–809; 248/183, 179, 176; 403/53, 67; 92/161

[56] References Cited
UNITED STATES PATENTS

| | | | |
|---|---|---|---|
| 2,867,922 | 1/1959 | Allin | 172/809 |
| 2,921,392 | 1/1960 | Bidwell | 172/809 |
| 3,039,213 | 6/1962 | Allin, Jr. | 172/809 |
| 3,391,747 | 7/1968 | Long | 172/809 |
| 3,572,446 | 3/1971 | Mazzarins | 172/809 |

*Primary Examiner*—Stephen C. Pellegrino
*Attorney, Agent, or Firm*—Cullen, Settle, Sloman & Cantor

[57] ABSTRACT

A trunnion mounting for a hydraulic lift cylinder of an earth working implement includes an outer race secured to and coplanar with a side wall of a crawler tractor. An inner race is rotationally maintained within the outer race by a plurality of bearing elements fitted in an annular raceway formed by complementary grooves on the mating surfaces of the inner and outer races. A set of spaced mounting blocks is releaseably secured to the inner race. Coaxial bores within the mounting blocks rotationally receive coaxial stub shafts of a hydraulic cylinder mounting ring. The mounting ring secures the hydraulic lift cylinder to the crawler tractor and includes a lubrication conduit system interconnecting both stub shafts.

25 Claims, 4 Drawing Figures

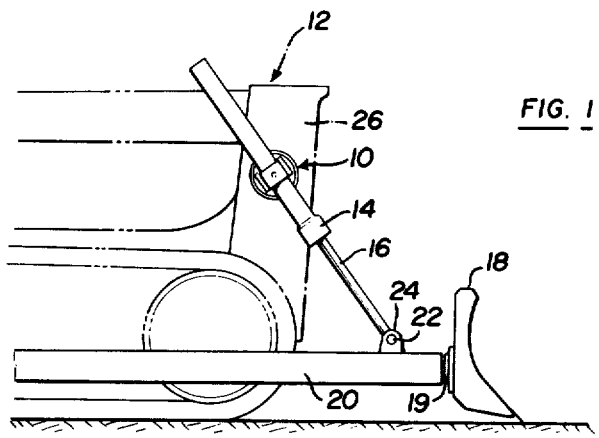
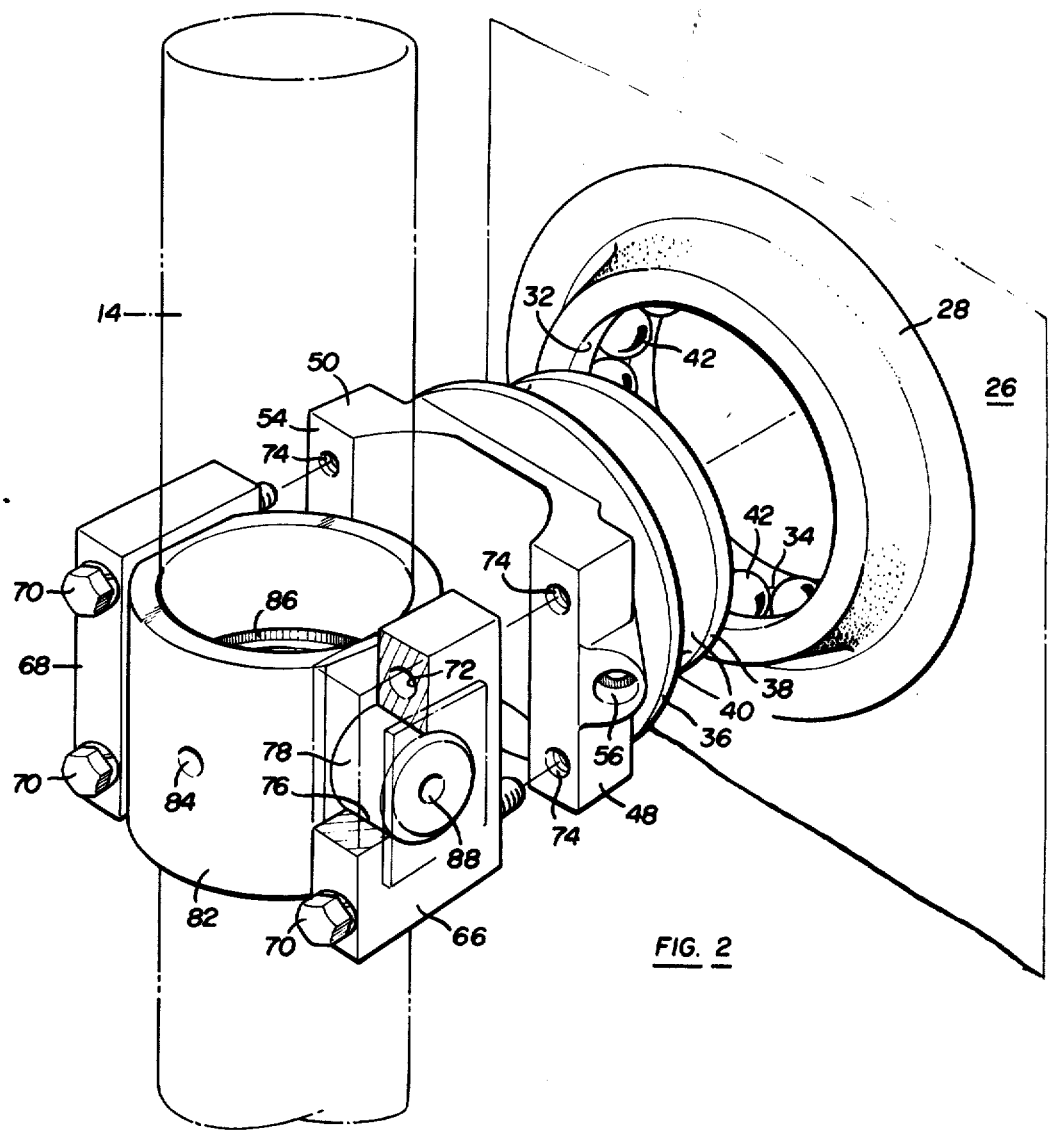

CYLINDER TRUNNION MOUNTING

BACKGROUND OF THE INVENTION

1. Field of the Invention

The present invention relates to earth working equipment having a trunnion connection for pivotally mounting a hydraulic actuator for an implement such as a bulldozing assembly.

2. Description of the Prior Art

Various earth working implements attached to crawler tractors and other earth working vehicles require movement in multiple axes. In particular, a bulldozing attachment must be attached to a crawler tractor so that it can be raised, lowered, tilted or pitched. These different attitudes are necessary so that the bulldozing assembly may be positioned relative to the tractor to accomplish any desired landscaping or earth working effect.

Typically, bulldozer assemblies are pivotally secured to the tractor implement by a push beam assembly and by a hydraulic lift cylinder mounted on opposed sides of the tractor. These hydraulic cylinders may be hydraulically manipulated through conventional controls on the tractor to achieve the various previously mentioned bulldozer attitudes. Since these hydraulic cylinders experience much of the shifting of the bulldozing assembly, there have been several prior art attempts to suitably mount the hydraulic cylinder to the tractor implement. For example, U.S. Pat. Nos. 2,867,922 to Allin and U.S. Pat. No. 2,624,131 to Rockwell illustrate a universal-type joint connection between each lift cylinder and tractor.

Because of the limitations and shortcomings in these prior art devices, for example restriction of movement and uneven stress distribution in the cylinder assembly, further development led to the trunnion mounting assembly disclosed in U.S. Pat. No. 3,039,213 to Allin, assigned to the Assignee of the instant application. Although this particular type trunnion assembly has proved to be quite an advancement in the art and highly advantageous, it was improved in certain respects according to the teachings in U.S. Pat. No. 3,391,747 to Long, also assigned to the Assignee of the instant application.

The basic trunnion-type mounting in U.S. Pat. No. 3,039,213 and other prior art devices include further shortcomings and disadvantages. For example, the outer raceway of prior art trunnions has been mounted either on a side face of a support member or a tractor side wall, resulting in relatively high cantilevered moment loads which can impair proper alignment of the trunnion unless special connections are utilized.

Prior art devices also do not permit freely reconstructing a trunnion assembly to accommodate different size hydraulic cylinders or hydraulic cylinder supporting rings. This drawback can be seen, for example, in U.S. Pat. No. 3,039,213. There, the yoke and inner race are a unitary assembly, thereby precluding the potential substitution of hydraulic lift cylinders or support rings without also having to substitute a different sized yoke. Accordingly, in the prior art, the use of different sized hydraulic lift cylinders required not only a different sized yoke, but also an entirely different and relatively expensive inner race assembly.

A further shortcoming in the prior art relates to the construction of the hydraulic cylinder supporting ring and lubrication system. As shown in U.S. Pat. No. 3,039,213, prior art devices typically include separate stub shafts to rotationally support the hydraulic supporting ring within the yoke assembly. To accommodate these shafts, close tolerance bores must be formed in load-bearing bosses on a supporting ring. Further, lubrication of the pivotal ring-shaft connection requires either disassembly of the unit or separate lubrication ports at each boss location.

The present invention overcomes the prior art shortcomings and drawbacks by the provision of the following improvements: First, a trunnion mounting raceway is constructed to be coplanar with the side wall of a tractor or other support, thereby reducing the cantilevered moment arm between the hydraulic lift cylinder axis and the plane of the raceway; Second, mounting blocks are provided, releaseably secured to the inner race to enable substitution of different length mounting blocks for accommodating different size hydraulic cylinders, hydraulic cylinder mounting rings or mounting ring stub shafts; and, Third, an integral hydraulic cylinder mounting ring and stub shafts are provided having a lubrication conduit system comprised of a single lubrication port communicating with each stub shaft by a groove on the inner periphery of the cylinder support ring.

SUMMARY OF THE INVENTION

The disclosed invention relates to a trunnion or gimbal-type mounting, and more particularly to a trunnion mounting on the side wall of a tractor or crawler. The improved trunnion mounting forming the present invention includes an outer race rigidly secured to the side wall of a tractor, or other supporting structure. A circular cutout or opening in the outer race includes a groove around its inner periphery to define approximately half a raceway for rotationally securing an inner race thereto. The inner race has a cylindrical base with a diameter substantially the same as that of a circular cutout in the outer race. This cylindrical base includes a complementary or mirror-image groove around its circumferential periphery which mates with the groove on the outer race to define the previously mentioned raceway. Bearing elements are located within the raceway to secure the inner race within the outer race and to permit rotational movement of the inner race. In the preferred embodiment, at least a portion of the raceway is coplanar with the side wall of the tractor or other supporting structure for a purpose to be described below.

The disclosed inner race also preferably includes ears projecting laterally away from the structure side wall and terminating in outward attachment faces. Mounting blocks are releaseably secured to these outward attachment faces by any suitable means, for example by a plurality of threaded bolts. The mounting blocks are generally parallel and each have a bore through its width which is coaxial with the bore of the other mounting block. A hydraulic cylinder support structure includes a circular ring having diametrically opposed, outwardly directed stub shafts rotationally received and supported within the coaxial bores of the mounting blocks. Since the mounting blocks are releaseably secured to the inner race in the preferred embodiment, the hydraulic cylinder support structure may easily be removed from the tractor for servicing and, further, different sized mounting blocks may be secured to the inner race to accommodate different size hydraulic support ring structure.

The preferred support ring structure futher includes a lubrication system, including a radial lubrication port through one side of the ring. An annular groove around at least a portion of the inner periphery of the ring interconnects the radial lubrication port with axial bores extending through the length of each stub shaft. The mounting block bores are closed at their opposed ends to define a closed lubrication system for the rotationally supported stub shafts within the mounting blocks. Accordingly, each stub shaft may be simultaneously lubricated by injecting lubricating fluid into the radial port, through the annular groove and shaft bores and into the closed mounting block bores.

As previously described, the preferred raceway defined between the inner and outer races is at least partially coplanar with the supporting wall structure. It can be readily appreciated that the hydraulic cylinder supported by the ring, stub shafts, and mounting blocks is subjected to high stress load levels in lifting the crawler tractor bulldozing assembly and in response to forces experienced by the bulldozing assembly and transmitted to the hydraulic cylinder. With the supporting raceway being coplanar with the support side wall structure, according to the present invention, the cantilevered moment arm measured from the center line of the hydraulic cylinder along the rotational axis of the inner race to the center line of the raceway grooves is reduced to thereby reduce rotational moment forces on the race grooves and support bearings. Hence, less wear is experienced on the trunnion parts resulting in a reduction of repair labor costs and repair parts costs as well as promoting proper operation of the trunnion assembly.

BRIEF DESCRIPTION OF THE DRAWINGS

FIG. 1 illustrates the trunnion mounting of the present invention in the environment of a crawler tractor.

FIG. 2 is an exploded perspective view of the trunnion mounting forming the present invention.

DETAILED DESCRIPTION OF THE INVENTION

Figure 3:
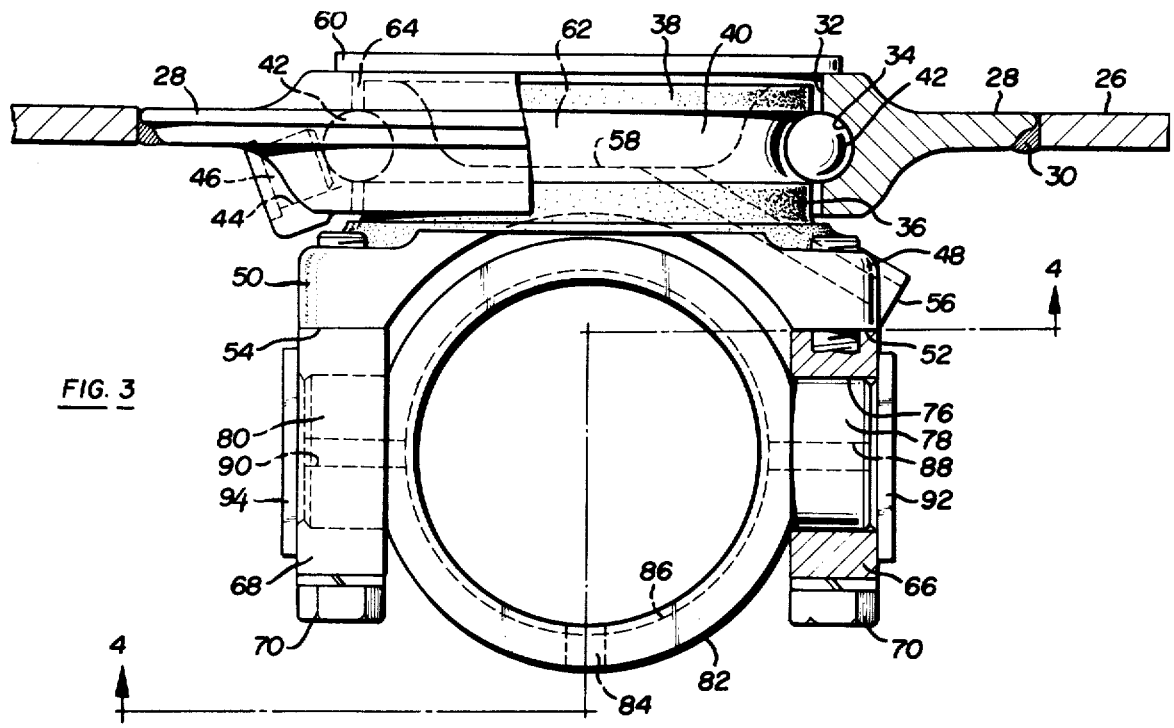
FIG. 3 is a fragmented top plan view of the trunnion mounting.

FIG. 1 illustrates a cylinder trunnion mounting 10 on the side wall 26 of a prime mover which is illustrated as a crawler tractor 12. Hydraulic lift cylinder 14 is suitably secured within the trunnion assembly and includes hydraulic piston rod 16 for lifting and lowering bulldozing blade assembly 18. As illustrated, piston rod 16 is pivotally connected to push beam 20 by a boss 24 and pin 22. Bulldozing assembly 18 may be pivotally connected to the push assembly, for example, by a universal connection 19. Push beam 20 is conventionally connected to the lower side structure of the crawler tractor 12 for example by a pivotal connection. Optionally, piston rod 16 may be pivotally connected directly to bulldozing blade assembly 18 by a similar type boss and pin construction.

Figure 4:
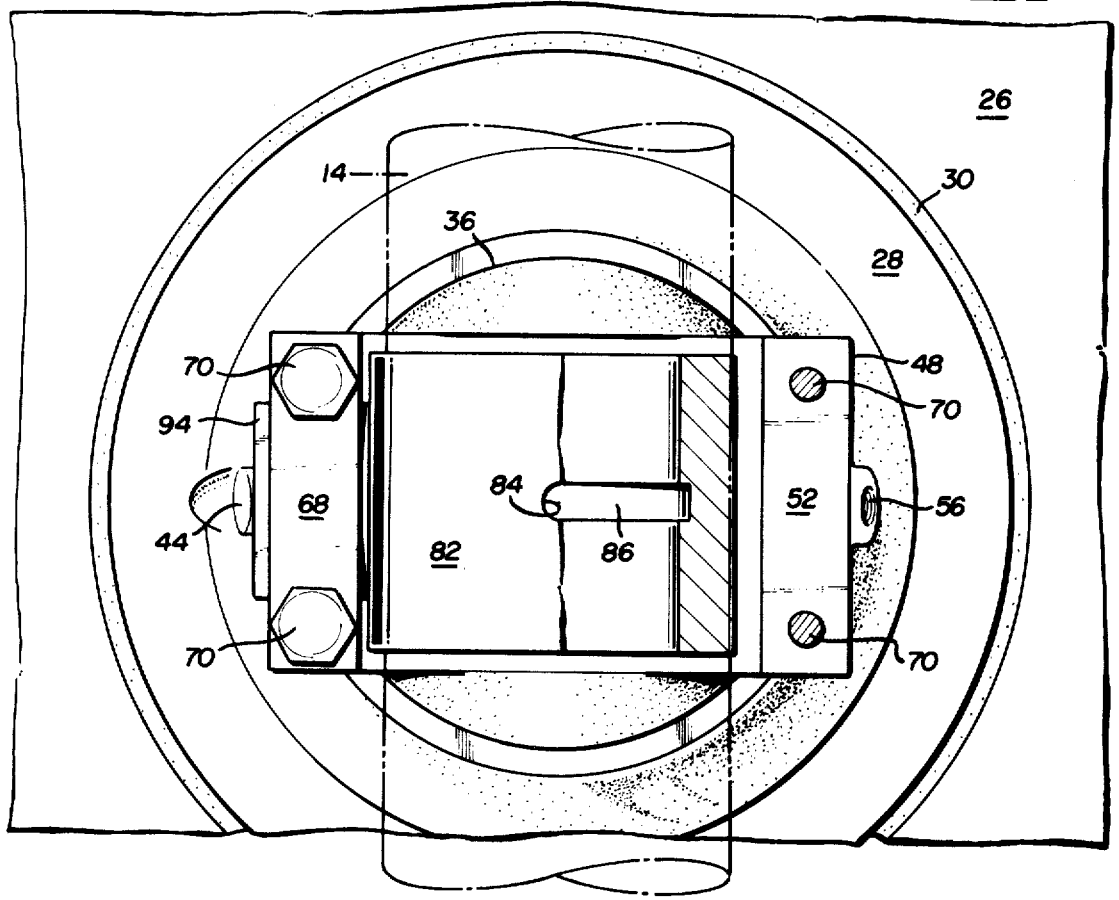
FIG. 4 is a sectional view along line 4—4 of FIG. 3.

As shown in FIGS. 2–4 the trunnion mounting of the present invention is rigidly attached to the side wall 26 of the crawler tractor 12. It is to be understood that the trunnion mounting of this invention is particularly suitable for tractor blade support and operation, but is not limited to such applications.

Trunnion 10 includes an outer race 28 which is preferrably rigidly and permanently secured to the supporting side wall 26, for example by welding as shown at 30. The outer race is preferably formed with a circular base having a circular cutout or opening 32 as best shown in FIG. 3. An annular semicircular groove 34 around the periphery of cutout 32 defines approximately half a ball bearing raceway as discussed below.

An inner race 36 includes a cylindrical base 38 having a diameter substantially the same as, but slightly less than, the circular cutout or opening 32 in inner race 28. A semi-circular groove 40 is located around the periphery of base 38 and is complementary with groove 34 to define a raceway for a plurality of ball bearing elements 42, which rotationally retain inner race 36 within outer race 28. Bearing elements 42 are preferably ball-type bearing elements, but any suitable bearing elements which can rotationally support inner race within outer race may be used.

Bearing elements 42 are placed within the raceway, after the inner race is properly positioned within the outer race, through port 44, the axis of which forms an angle with the plane of the supporting side wall of approximately 20 to 45%. Such an arrangement enables the ball bearing elements to be inserted into the raceway yet allows the outer race to be flushed mounted with the supporting side wall structure. Bearing elements 42 are prevented from accidental removal from the raceway by threaded plug 46 received within port 44.

From FIG. 3 it can be seen that the raceway defined by grooves 34 and 40 is located within the lateral width of the supporting side wall structure 26. Such an arrangement is highly advantageous from the standpoint of reducing the cantilevered moment forces produced on the race supporting structure by loads transmitted along hydraulic cylinder 14 through other trunnion supporting elements to be described below.

Inner race 34 further includes ears 48 and 50 laterally projecting outwardly from cylindrical base 36 away from the rotational axis of the raceway assembly. Ears 48 and 50 terminate in outer attachment faces 52 and 54, respectively, to receive hydraulic cylinder support structure to be described below. A lubrication port 56 extends from a side face of ear 52 and communicates with the rear face 58 of inner race 36. Cover plate 60 is suitably secured to the rear face of outer race 28, for example by welding, and defines a lubrication cavity 62 between the rear face 58 of the inner race. To lubricate bearings 42, lubricating fluid is injected into and through port 56, into the lubrication cavity 62, and through space 64 between the circular opening 32 and cylindrical base 38.

Mounting blocks 66 and 68 are suitably releasebly secured to outer attachment faces 52 and 54, respectively, for example by a plurality of bolts 70 fitted into appropriate bores 72 in the mounting blocks and threaded bores 74 in the inner race ears.

Each mounting block includes a circular bore 76 extending through the block width to rotationally receive and support diametrically opposed stub shafts 78 and 80 of hydraulic mounting cylinder ring 82. Hydraulic cylinder 14 is suitably secured to supporting ring 82, for example by heat shrinking or welding.

The releaseable securement feature for the mounting blocks is highly advantageous since it renders the trunnion inner and outer raceway structure highly versatile.

For example, in the situation that a different size hydraulic cylinder should be used, all that is required is different sized mounting blocks, for example blocks having greater lengths or larger bores to accommodate larger stub shafts. Accordingly, a standard sized inner race may be manufactured to accommodate different hydraulic cylinders or supporting structure.

Lubrication port 84 extends laterally through the width of ring 82 and communicates with axial bores 88 and 90 in stub shafts 78 and 80, respectively, by an annular groove 86. As illustrated in FIGS. 2-4, groove 86 extends around the entire inner periphery of ring 82. Optionally, this groove may extend only around half the inner periphery of the supporting ring, i.e. from bore 88 clockwise as viewed in FIG. 3 around the bore 90 to establish communication between each stub shaft bore and port 84. Cover plates 92 and 94 are suitable secured to mounting blocks 66 and 68, respectively, for example by welding, to close the opposed ends of bores 76 and thereby define a closed lubrication passageway system for each stub shaft. Optionally, bores 76 may extend through less than the entire width of the mounting blocks to accomplish the same result. Lubrication of the stub shafts within the mounting blocks is effected by injecting a lubricating fluid into port 84. The lubricating fluid then flows in the groove 86 between ring 82 and hydraulic cylinder 14 into and through axial bores 88 and 90, then into bores 76 to reduce frictional wear due to rotational movement of the stub shafts within the mounting block bores.

To assemble the trunnion mounting assembly forming the present invention, certain elements are first welded together. For example cover plates 92 and 94 are welded to mounting blocks 66 and 68, respectively, and cover plate 60 is welded to the rear face of outer race 28. Next, outer race 28 is welded to the supporting side wall structure 26. Inner race 36 is then properly located within the outer race and retaining balls 42 are introduced into the raceway defined by grooves 34 and 40 through port 44. After plug 46 is properly located within port 44, the mounting blocks are placed on the support ring stub shafts and then bolted to inner race 36.

After assembly and during operation, the hydraulic lift cylinder has complete freedom of movement in any direction. For example, it may rotate about an axis perpendicular to the plane of the supporting side wall structure due to the ball bearing raceway structure. Further, the hydraulic cylinder may rotate about an axis perpendicular to the rotational axis of the raceway as a result of the rotational connection between the stub shafts and mounting blocks.

It is to be further understood that the above description is merely exemplary and does not limit the invention to exclude various innovations and changes which will be apparent to those skilled in the art.

Having fully described my invention, I claim:

1. A combination tractor and earth working implement, including a tractor side wall having a trunnion mounting therein, said tractor side wall having an opening therein, and said trunnion mounting comprising:

an outer race having an outer peripheral configuration complementary with the opening in the tractor side wall, said outer race being positioned within the side wall opening and being welded to and coplanar with said tractor side wall and having an axis of rotation perpendicular to said wall, the outer race having a circular opening perpendicular to said axis and a groove around the periphery of said opening facing toward said axis and forming approximately half a bearing raceway, an inner race having a generally cylindrical base with a diameter substantially equal to, but slightly less than, the diameter of said outer race opening, an annular groove around the periphery of said base and complementary with the outer race groove defining approximately the other half of the bearing raceway, said inner race rotationally secured within said outer race by a plurality of ball bearing elements within the raceway defined by the complementary, concentrically aligned grooves, at least a portion of said raceway being coplanar with said tractor side wall, a support assembly projecting outwardly from said inner race and including means for rotationally supporting an additional element about an axis perpendicular to the outer race axis of rotation;

said portion of the raceway being coplanar with the tractor side wall such that the cantilevered moment on the side wall is reduced;

said outer race having a ball bearing installation port including a bore extending from an outer exposed surface of said outer race to the raceway, said port forming an angle with the plane of said tractor side wall.

2. The combination defined in claim 1, characterized in that the support assembly includes a yoke projecting outwardly from and rotational with said inner race, opposed arms each having a cylindrical bore coaxial with the bore of the other arm, a hydraulic cylinder support having a ring, and diametrically opposed stub shafts rotationally received in the yoke arm bores.

3. The combination defined in claim 1, further including a hydraulic lift cylinder secured within said support assembly, a piston rod extending from said lift cylinder and pivotally connected to said earth working implement.

4. A combination tractor and earth working implement, including a tractor side wall having a trunnion mounting secured thereto, said trunnion mounting comprising:

a support member connected to said tractor side wall, a yoke rotationally mounted within said support about an axis generally perpendicular to said side wall, said yoke including opposed arms having coaxial cylindrical bores with opposed ends, the common axis of said bores being generally perpendicular to the yoke rotational axis, a hydraulic cylinder support including a ring having diametrically opposed shafts rotationally received in said cylindrical bores, said hydraulic support further having a lubrication conduit system for said shafts including an annular groove around the inner periphery of said ring, a radial bore through the length of each shaft communicating with said annular groove, and a lubrication port on said ring communicating with said annular groove, whereby both shafts may be lubricated simultaneously through a single lubrication port.

5. The combination defined in claim 4, characterized in that said ring and shafts are integral.

6. The combination defined in claim 4, characterized in that said support connected to the tractor side wall includes an outer race coplanar with said tractor side wall, the outer race having a circular cutout coaxial with said yoke rotation axis and a groove around the periphery of said cutout opening toward the yoke rotation axis,
- said yoke further including an inner race having a cylindrical base with a diameter substantially equal to, but less than, the diameter of said outer race cutout, a groove around the periphery of said base, said opposed arms extending outwardly from said base,
- said inner race rotationally secured within said outer race by a plurality of bearing elements within a raceway defined by the complementary, concentrically aligned grooves on the inner and outer races, at least a portion of said raceway lying within the lateral width of said tractor wall, so that the cantilevered moment on said inner race by said hydraulic cylinder support is reduced.

7. The combination defined in claim 4, characterized by said yoke further including a base rotationally mounted within said support, said arms including two one-piece mounting blocks releaseably secured to said base, each mounting block having an inward side generally facing the opposed mounting block, said bores located through each inward side of the mounting blocks,
- said mounting blocks being releaseably secured to said base so that various support shaft sizes may be used on the same or different cylinders by merely replacing one mounting block with another having a different size bore, and further, so that different size cylinder mountings may be used on the same trunnion mounting by simply replacing a particular mounting block with another having a different length.

8. The combination defined in claim 4, further including a hydraulic lift cylinder secured within said support ring, and a piston rod extending from said cylinder and pivotally connected to said earth working implement.

9. A combination tractor and earth working implement, including a tractor side wall having a trunnion mounting connected thereto, said trunnion mounting comprising:
- a support member rotationally connected to said side wall for rotation about an axis generally perpendicular to said side wall, said member having a pair of outward attachment faces,
- a one-piece block releaseably secured to each outward attachment face to form opposed supporting arms, each mounting block having an inner face facing the opposed mounting block, a circular bore through each inner face of the mounting blocks, said bores being coaxial and said bore axes being generally parallel to the tractor side wall,
- a hydraulic cylinder support including a ring and diametrically opposed outwardly extending shafts pivotally supported in said mounting block bores,
- said blocks being releaseably secured to said attachment faces by bolts extending through each mounting block and being threadably received in said support member, so that various support shaft sizes may be used on the same or different cylinders by merely replacing one mounting block with another having a different diameter bore, and further, so that various cylinder mountings may be used on the same trunnion mounting by merely replacing a particular mounting block with another having a different length.

10. The combination defined in claim 9, characterized in that said trunnion mounting further includes an outer race secured to and coplanar with said tractor side wall, said outer race having a circular cutout and a groove around the periphery of said cutout,
- said support member rotationally connected to the side wall including an inner race having a cylindrical base with a diameter substantially equal to, but less than, the diameter of said outer race cutout, a groove around the outer circumferential periphery of said circular base,
- said inner race rotationally secured within said outer race by a plurality of bearing elements within the raceway defined by the complementary, concentrically aligned grooves, at least a portion of said raceway lying within the lateral width between the opposed tractor side wall faces, so that the rotational axis of the hydraulic cylinder support is moved closer to tractor side wall to diminish the cantilevered moment on said trunnion mounting.

11. The combination defined in claim 9, characterized in that said mounting block bores have opposed, closed ends, and
- said hydraulic cylinder support further having a lubrication conduit system including a radial lubrication port through the ring, a bore through the length of each shaft, and a groove on the inner periphery of said ring establishing communication between said radial port and said bores, so that the rotational connection of both shafts within said mounting block bores may be simultaneously lubricated via the single lubrication port.

12. The combination defined in claim 9, further including a hydraulic lift cylinder secured in said support ring, and a piston rod extending from said cylinder and pivotally connected to said earth working implement.

13. An improved trunnion mounting connected to a structure side wall, said side wall having an opening therein and said trunnion mounting comprising:
- an outer race having an outer peripheral configuration complementary with the opening in said side wall, said outer race being positioned within the side wall opening and being welded to and coplanar with said side wall, the outer race having a circular opening and a groove around the periphery of said opening,
- an inner race having a cylindrical base with a diameter substantially equal to, but less than, the diameter of said outer race opening, a groove around the periphery of said base,
- said inner race rotationally secured within said outer race by a plurality of ball bearing elements within a raceway defined by the complementary, concentrically aligned grooves, at least a portion of said raceway being coplanar with said structure side wall,
- a yoke assembly mounted on said inner race,
- a hydraulic cylinder support including a ring and diametrically opposed outwardly extending shafts rotationally received in said yoke assembly,
- said portion of the raceway being coplanar with the structure side wall in order to locate the rotational axis of said support shafts closer to the structure side wall and thereby reduce the cantilevered moment on said side wall; and said outer race having a bearing installation port including a bore extending from an outer exposed surface of said outer race to the raceway, said port forming an angle with the plane of the structure side wall.

14. An improved trunnion mounting connected to a structure side wall, a yoke assembly rotationally mounted on said side wall, said yoke including opposed arms projecting away from said side wall and having coaxial cylindrical bores with opposed closed ends, a hydraulic cylinder support including a ring and radially outwardly directed diametrically opposed shafts rotationally received in and supported by cylindrical bores, said hydraulic cylinder support further having a lubrication conduit system for said shafts including a bore through the length of each shaft, a lubrication port on said ring, and a groove on the inner periphery of said ring connecting each shaft bore with said lubrication port, so that both shafts within the closed yoke bores may be lubricated simultaneously via the single lubrication port.

15. The improved trunnion defined in claim 14, characterized in that the opposed arms of said yoke assembly include a pair of mounting blocks releaseably secured to a yoke base member, said mounting blocks being releaseably mounted so that various support shaft sizes may be used on the same or different cylinders by merely replacing one mounting block with another having a different size bore, and further, so that various cylinder mountings may be used on the same gimbal mounting by merely replacing a particular mounting block with another having a different length.

16. The improved trunnion defined in claim 14, characterized in that said ring and shafts are a one-piece element.

17. The improved trunnion mounting defined in claim 14, further including a support connected to the structure side wall, said support having an outer race coplanar with said structure side wall, the outer race having a circular cutout and a groove around the periphery of said cutout, said yoke further including an inner race having a cylindrical base with a diameter substantially equal to, but less than, the diameter of said outer race cutout, a groove around the periphery of said base, said opposed arms extending outwardly from said base, said inner race rotationally secured within said outer race by a plurality of bearing elements within the raceway defined by the complementary, concentrically aligned grooves on the inner and outer races, at least a portion of said raceway lying within the lateral width of said structure wall, so that the cantilevered moment on said inner race produced by said hydraulic cylinder support is reduced.

18. An improved trunnion mounting, comprising:
a support member,
an additional member rotationally supported within said support member, said additional member having a pair of outward attachment faces, a mounting block releaseably secured to each outward attachment face to form opposed supporting arms, each mounting block having an inward side generally facing the opposed mounting block, a circular bore through each inward side of the mounting blocks, said bores being coaxial, a hydraulic cylinder support including a ring and diametrically opposed outwardly extending shafts rotationally received in said mounting block bores, said blocks being releaseably secured to said attachment faces by a plurality of bolts extending through each mounting block and being threadably received in said addtional member, so that various support shaft sizes may be used on the same or different cylinders by merely replacing one mounting block with another having a different diameter bore, and further, so that various cylinder mountings may be used on the same trunnion mounting by merely replacing a particular mounting block with another having a different length.

19. The improved trunnion mounting defined in claim 18, characterized in that said support member includes an outer race, said outer race having a circular cutout and a groove around the periphery of said cutout, said additional member including an inner race having a cylindrical base with a diameter substantially equal to, but less than, the diameter of said outer race cutout, a groove around the outer circumferential periphery of said cylindrical base, said inner race rotationally secured within said outer race by a plurality of ball bearing elements within the raceway defined by the complementary, concentrically aligned grooves.

20. The combination defined in claim 18, characterized in that said mounting block bores have opposed, closed ends, and said hydraulic cylinder support further having a lubrication conduit system including a radial lubrication port through the ring, a bore through the length of each shaft, and a groove on the inner periphery of said ring connecting said radial port and said bores, so that the rotational connection of both shafts within said mounting block bores may be simultaneously lubricated via the single lubrication port.

21. A combination tractor and earth working implement, including a generally vertical tractor side wall having a trunnion mounting connected thereto, said trunnion mounting comprising:

an outer race rigidly connected to and coplanar with said tractor side wall, the outer race having a circular cutout and a semi-circular groove around the periphery of said cutout, an inner race having a cylindrical base with a diameter substantially equal to, but less than, the diameter of said outer race cutout, a semi-circular groove around the periphery of said base having a radius substantially equal to the radius of the groove on the outer race, said inner race further having a pair of laterally opposed ears projecting from one end of the base and each terminating in an outward attachment face, said inner race rotationally secured within said outer race by a plurality of ball bearing elements within the raceway defined by the complementary, concentrically aligned semi-circular grooves, at least a portion of said raceway lying within the lateral width defined by the planes of the opposed vertical faces of said tractor side wall, a mounting block releaseably secured to each attachment face of said ears to form opposed supporting arms, each mounting block having an inward side generally facing the opposed mounting block, a circular bore through each inward side of the mounting blocks, said bores having opposed closed ends and being coaxial, the common axis of said bores being perpendicular to the rotational axis of said inner race, a hydraulic cylinder support including a ring having integral, diametrically opposed outwardly extending stub shafts rotationally received in said mounting block bores, said support further having a lubrication conduit system for said stub shafts including an annular groove around the inner periphery 22. A combination tractor and earth working implement, including a tractor side wall having a trunnion mounting therein, said trunnion mounting comprising:

an outer race integral and coplanar with said tractor side wall and having an axis of rotation perpendicular to said wall, the outer race having a circular opening perpendicular to said axis and a groove around the periphery of said opening facing toward said axis and forming approximately half a bearing raceway, an inner race having a generally cylindrical base with a diameter substantially equal to, but slightly less than, the diameter of said outer race opening, an annular groove around the periphery of said base and complementary with the outer race groove defining approximately the other half of the bearing raceway, said inner race rotationally secured within said outer race by a plurality of bearing elements within the raceway defined by the complementary, concentrically aligned grooves, at least a portion of said raceway located within the lateral width of said tractor side wall, a support assembly projecting outwardly from said inner race and including means for rotationally supporting an additional element about an axis perpendicular to the outer race axis of rotation;

the raceway defined at least in part within the lateral width of the tractor side wall thereby reducing the cantilevered moment on said trunnion mounting by said additional element;

said support assembly including a yoke projecting outwardly from and rotational with said inner race, opposed arms each having a cylindrical bore coaxial with the bore of the other arm, a hydraulic cylinder support having a ring, and diametrically opposed stub shafts rotationally received in the yoke arm bores;

said ring and shafts of said hydraulic cylinder support being integral, and said hydraulic cylinder support further having a lubrication conduit system including an annular groove around the inner periphery of said ring, a radial bore through the length of each stub shaft communicating with said annular groove, and a lubrication port on said ring communicating with said annular groove, so that both stub shafts may be lubricated simultaneously via the single lubrication port.

23. A combination tractor and earth working implement, including a tractor side wall having a trunnion mounting therein, said trunnion mounting comprising:

an outer race integral and coplanar with said tractor side wall and having an axis of rotation perpendicular to said wall, the outer race having a circular opening perpendicular to said axis and a groove around the periphery of said opening facing toward said axis and forming approximately half a bearing raceway, an inner race having a generally cylindrical base with a diameter substantially equal to, but slightly less than, the diameter of said outer race opening, an annular groove around the periphery of said base and complementary with the outer race groove defining approximately the other half of the bearing raceway, said inner race rotationally secured within said outer race by a plurality of bearing elements within the raceway defined by the complementary, concentrically aligned grooves, at least a portion of said raceway located within the lateral width of said tractor side wall, a support assembly projecting outwardly from said inner race and including means for rotationally supporting an additional element about an axis perpendicular to the outer race axis of rotation;

the raceway defined at least in part within the lateral width of the tractor side wall thereby reducing the cantilevered moment on said trunnion mounting by said additional element;

said support assembly including a yoke projecting outwardly from and rotational with said inner race, opposed arms each having a cylindrical bore coaxial with the bore of the other arm, a hydraulic cylinder support having a ring, and diametrically opposed stub shafts rotationally received in the yoke arm bores;

said yoke including a pair of opposed ears projecting laterally from said inner race, said ears terminating in outward attachment faces, said yoke further including a pair of opposed mounting blocks releaseably secured to said attachment faces, each mounting block having an inward side generally facing the opposed mounting block, said bores located through each inward side of the mounting blocks, said blocks being releaseably secured to said inner race so that various support stub shaft sizes may be used on the same or different cylinders by merely replacing one mounting block with another having a different size receptacle bore, and further, so that various cylinder mountings may be used on the same trunnion mounting by merely replacing a particular mounting block with another having a different length.

24. An improved trunnion mounting connected to a structure side wall, comprising:

an outer race secured to and coplanar with said side wall, the outer race having a circular opening and a groove around the periphery of said opening, an inner race having a cylindrical base with a diameter substantially equal to, but less than, the diameter of said outer race opening, a groove around the periphery of said base, said inner race rotationally secured within said outer race by a plurality of bearing elements within the raceway defined by the complementary, concentrically aligned grooves, at least a portion of said raceway lying within the lateral width between the opposed faces of said structure side wall, a yoke assembly mounted on said inner race, a hydraulic cylinder support including a ring and diametrically opposed outwardly extending shafts rotationally received in said yoke assembly, the raceway defined at least in part within the lateral width of the structure side wall in order to locate the rotational axis of said support shafts closer to the structure side wall and thereby reduce the cantilevered moment on said trunnion mounting by said hydraulic cylinder support;

said ring and shafts of said hydraulic cylinder support being integral, and said hydraulic cylinder support having a lubrication conduit system including an annular groove around the inner periphery of said ring, a radial bore through the length of each stub shaft communicating with said annular groove, and a lubrication port on said ring communicating with said annular groove, so that both stub shafts may be lubricated simultaneously via the single lubrication port.

25. An improved trunnion mounting connected to a structure side wall, comprising:

an outer race secured to and coplanar with said side wall, the outer race having a circular opening and a groove around the periphery of said opening, an inner race having a cylindrical base with a diameter substantially equal to, but less than, the diameter of said outer race opening, a groove around the periphery of said base, said inner race rotationally secured within said outer race by a plurality of bearing elements within the raceway defined by the complementary, concentrically aligned grooves, at least a portion of said raceway lying within the lateral width between the opposed faces of said structure side wall, a yoke assembly mounted on said inner race, a hydraulic cylinder support including a ring and diametrically opposed outwardly extending shafts rotationally received in said yoke assembly, the raceway defined at least in part within the lateral width of the structure side wall in order to locate the rotational axis of said support shafts closer to the structure side wall and thereby reduce the cantilevered movement on said trunnion mounting by said hydraulic cylinder support;

said yoke including a pair of opposed ears projecting laterally from the outer face of said inner race, said ears terminating in outward attachment faces, said yoke further including a pair of opposed mounting blocks releaseably secured to said attachment faces, each mounting block having an inward side generally facing the opposed mounting block, a circular bore through each inward side of the mounting blocks, rotationally receiving and supporting said support shafts, said blocks being releaseably secured to said inner race so that various support shaft sizes may be used on the same or different cylinders by merely replacing one mounting block with another having a different size bore, and further, so that various cylinder mountings may be used on the same trunnion mounting by merely replacing a particular mounting block with another having a different length.

* * * * *